No. 665,283. Patented Jan. 1, 1901.
G. W. TERRY.
VEHICLE AXLE NUT.
(Application filed Oct. 1, 1900.)
(No Model.)
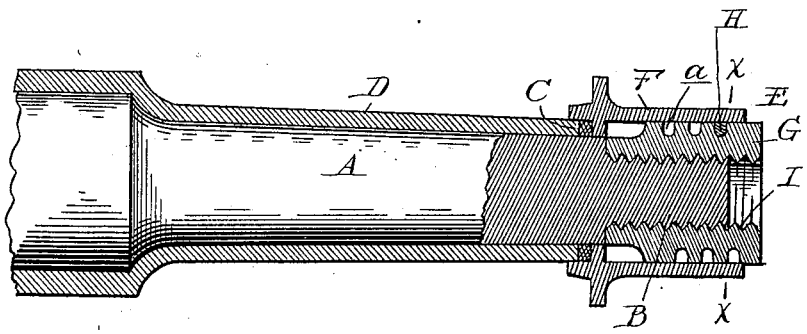
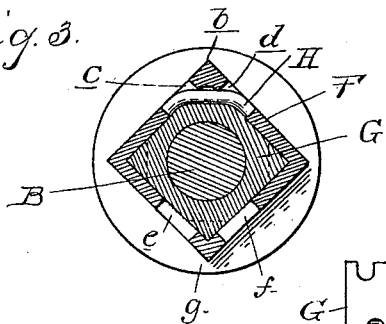
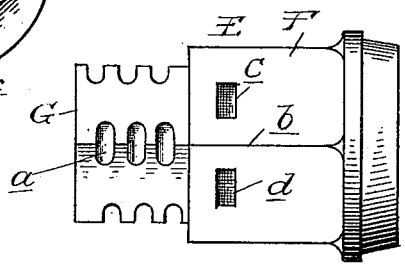
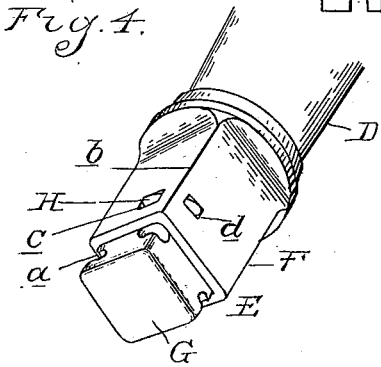
Witnesses
Inventor
George W. Terry

United States Patent Office.

GEORGE W. TERRY, OF PONTIAC, MICHIGAN, ASSIGNOR OF TWO-THIRDS TO ELMER H. STOWELL AND ISAAC E. TERRY, OF SAME PLACE.

VEHICLE-AXLE NUT.

SPECIFICATION forming part of Letters Patent No. 665,283, dated January 1, 1901.

Application filed October 1, 1900. Serial No. 31,722. (No model.)

*To all whom it may concern:*

Be it known that I, GEORGE W. TERRY, a citizen of the United States, residing at Pontiac, in the county of Oakland and State of Michigan, have invented certain new and useful Improvements in Vehicle-Axle Nuts, of which the following is a specification, reference being had therein to the accompanying drawings.

The invention has reference to axle-nuts composed of two telescoping members; and the invention consists in the means employed for securing or locking the members to each other.

The invention further consists in the novel arrangement and combination of the parts, as will be hereinafter described and shown.

In the drawings Figure 1 is a vertical central section through an axle-spindle and the nut thereon. Fig. 2 is a side elevation of the nut. Fig. 3 is a section taken on line $xx$, Fig. 1; and Fig. 4 is a perspective view of the axle and nut, the parts of the latter being locked as in use.

In the drawings thus briefly described the reference-letter A designates the axle-spindle, having the usual threaded end or nipple B. C is the usual washer bearing against the axle-box D, and E designates the nut. In construction the nut is composed of two telescoping sections or members F and G, which are adapted to be locked to each other by means of a locking-pin H, hereinafter referred to. The inner member G is provided with an internally-screw-threaded socket I, which receives the spindle end and has formed upon its exterior a polygonal surface, as shown in Fig. 3. The edges of the surface described formed by the meeting sides of the faces are each provided with a series of transverse slots or grooves, such as $a$, and these grooves are so arranged in the edges that the groove in one edge will be slightly to one side of the groove in the next adjoining edge, so that a spiral or screw effect will be obtained by the notches. The outer member F is similar in configuration to the external surface of the inner member and has formed therein upon opposite sides of one of its edges $b$ two transverse slots $c$ $d$.

In assembling the parts the inner member is first screwed upon the spindle end and the extensible outer member F is sleeved thereover and forced into contact with the washer C to take up the lost motion. The locking-pin H is then inserted through the slots $c$ and $d$ and a notch in the inner member registering with the slots. The projecting pin ends are then bent over so as to lie fully within the slots in the outer member, as shown. If after telescoping the members it is found that the slots in the outer member fail to register with a notch in the inner member, the parts may be disengaged and the outer section turned to a quarter, half, or three-quarters of a revolution until a notch is found that will aline with the slots. In practice it is found that a half-revolution of the outer member is all that is generally required for the adjustment. So to avoid removing the sections one from another I form in the outer member slots $e$ and $f$ on opposite sides of the edge $g$, as shown, through which the pin may be inserted.

What I claim as my invention is—

1. An axle-nut comprising an inner member recessed and internally screw-threaded and provided with a polygonal outer surface, the edges thereof being slotted transversely as described, an outer member corresponding in configuration to the external surface of the inner member and having slots or openings formed therein upon opposite sides of one edge thereof, and a transverse locking-pin having its ends extending and bent to lie wholly within the slots in the outer member and the portion intermediate the ends engaging one of the slots in an edge of the inner member, substantially as described.

2. An axle-nut comprising two telescoping sections having a sliding engagement one with the other and held from independent rotary movement, the inner member being provided with an internally-screw-threaded socket adapted to receive the spindle end and means for locking the members against endwise movement comprising a transverse pin having its ends engaging the outer member and the portion intermediate the ends engaging the inner member.

In testimony whereof I affix my signature in presence of two witnesses.

GEORGE W. TERRY.

Witnesses:
M. B. O'DOGHERTY,
H. C. SMITH.